United States Patent [19]
Lubbock et al.

[11] 3,900,336
[45] Aug. 19, 1975

[54] NOVEL AUTOXIDIZABLE LIQUIDS

[75] Inventors: Frederick John Lubbock, Beaumaris; Livia Polgar, Caulfield, both of Australia

[73] Assignee: Dulux Australia Ltd., Melbourne, Australia

[22] Filed: Apr. 25, 1974

[21] Appl. No.: 464,234

[30] Foreign Application Priority Data
May 18, 1973 Australia.............................. 3366/73

[52] U.S. Cl. ................................................ 106/252
[51] Int. Cl.² .......................................... C09D 3/26
[58] Field of Search .......... 106/287, 252; 260/910.6

[56] References Cited
OTHER PUBLICATIONS
Chem. Abst., 63: 13571 b, 1965.

*Primary Examiner*—Theodore Morris
*Attorney, Agent, or Firm*—Cushman, Darby & Cushman

[57] ABSTRACT

Liquid, non-polymeric, autoxidizable fatty acid esters of polyols comprising 3.5–4.5 fatty acid residues and 0.8–1.4 acrylyl or methacrylyl residues per mol, with acid values of 45–75 mgm KOH per gm and molecular weight of 1500–3000 are disclosed. Their use as film-forming constituents of high solids paints is described.

3 Claims, No Drawings

NOVEL AUTOXIDISABLE LIQUIDS

This invention relates to non-polymeric autoxidizable compounds and to paints comprising such compounds.

Liquid, autoxidizable, monocarboxylic fatty acid esters of polyols in the form of triglyceride drying oils have been traditional film-forming components of many types of paint. Although inherently useful for this purpose because of their autoxidative characteristics, the drying oils were deficient in rate of drying and did not produce sufficiently hard or tough films for many applications. Various means devised to overcome these limitations have involved some degree of thermal polymerisation of the oils or incorporation of their fatty acids constituents in synthetic polymers, notably in oil-modified alkyd resins. A penalty incurred for the benefits so-gained is that because of the increased intrinsic viscosity of the polymeric product so-produced relative to that of drying oils, it has been necessary to introduce into the formulations volatile "thinners" to maintain comparable and useable paint viscosities. It is therefore not unusual to find that a wet paint film as applied to a substrate contains 40–60% by weight of expensive and atmosphere-polluting volatile, non-film-forming thinner.

We have now discovered a group of compounds comprising drying oil fatty acids which are essentially non-polymeric and autoxidizable. When compared with conventional film-forming materials they offer an outstanding combination of low intrinsic viscosity with excellent through-dry and surface-dry when allowed to autoxidize in air. This permits the formulation of quick-drying paints at very high application solids. The compounds may be pigmented by dispersing pigment therein in conventional manner. Our compounds have the additional valuable characteristic that before they have autoxidized they may be dissolved or dispersed in water to which a base such as ammonia has been added, thus facilitating the clean-up of spills and application equipment, e.g. brushes and rollers, with a commonly available liquid.

Accordingly we now provide a liquid, non-polymeric, autoxidizable monocarboxylic fatty acid ester of a polyhydric alcohol, characterised in that the ester comprises an average 3.5–4.5 autoxidizable fatty acid residues and 0.8–1.4 acrylyl or methacrylyl residues per molecule, has an acid value of 45–75 mgm KOH per gm provided by carboxyl groups attached thereto and a molecular weight of 1500–3000.

By acrylyl or methacrylyl residues we mean moieties of the structures:

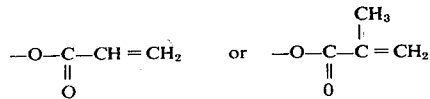

Thus our compounds may be considered as drying oil fatty acids esters of polyols, which polyols comprise sufficient hydroxyl groups to permit esterification with the requisite number of fatty acids the above-defined numbers of carboxyl groups and acrylyl or methacrylyl residues. However, in order to avoid polymerisation reactions during the preparation of the esters and thus to remain within our stipulated molecular weight range, we have found it desirable to avoid preparation of our esters by the direct esterification of such polyols. We will, therefore, disclose hereinunder the composition of our compounds in more detail by reference to one preferred method of manufacture.

A polyhydric alcohol containing the requisite number of hydroxyl groups is first esterified with from 3.5–4.5 mol fatty acid per mol of polyhydric alcohol. The required number of hydroxyl groups will be evident from the continuing description of our process. The esterification must be carried out at temperatures not exceeding 240°C to avoid thermal polymerisation of the fatty acids. Those skilled in the art will recognise that it is unlikely that all polymerisation will be avoided but in our experience, provided the reaction temperature is maintained at 240°C maximum, the amount of polymerisation which does occur is insignificant.

Suitable polyhydric alcohols for use in the above manner are, for example, di-pentaerythritol, tripentaerythritol, sorbitol and the di- tri- and tetradimethylol propionic acid esters of pentaerythritol. If the selected polyhydric alcohol contains hydroxyl groups in excess of those required for the preparation of an ester according to this invention, the excess hydroxyl groups may be left unreacted or esterified with monocarboxylic acids other than autoxidizable fatty acids. Monobasic acids which may be used for this purpose are, for example, benzoic acid, p-tert. butyl benzoic acid and p-nitrobenzoic acid. In general, saturated monocarboxylic fatty acids are to be avoided as they produce paint films which are too soft for most purposes.

Autoxidizable fatty acids which may be used are, for example, the commercial mixed fatty acids known as linseed, soya, safflower, cottonseed and tall oil fatty acids. Segregated fatty acids derived from the above oil acids are becoming more readily available and are equally suitable for use in our invention. Blends of fatty acids may also be used. In calculating the theoretical molecular weight of our esters, which must lie within the limits of 1500–3000, we assume average values for the molecular weights of the appropriate fatty acids; as quoted in standard handbooks. A weighted average value based on relative concentrations is used for mixtures of acids.

The next step in the process we are describing is to react acid anhydrides with at least some of the remaining hydroxyl groups of the polyhydric alcohol. We prefer to carry out this reaction at 120°–160°C which is a suitable temperature to cause the anhydride ring to open but insufficient to esterify the carboxyl groups so-formed. The number of carboxyl groups introduced must be sufficient to allow for introduction of the desired concentration of acrylyl or methacrylyl residues in the next stage of our process but leaving a residue of unreacted carboxyl groups corresponding to the specified acid value limits of the completed ester.

Suitable acid anhydrides for use in the above manner are, for example, maleic, phthalic and trimellitic anhydride and maleinised fatty acid, e.g. maleinised linseed oil fatty acid.

The final step in the preparation of the liquid autoxidizable ester is to react portion of the free carboxyl groups with glycidyl acrylate or glycidyl methacrylate. We carry out this reaction at temperatures of the order of 120°C, optionally in the presence of a polymerisation-inhibiting concentration of an inhibitor such as, for example, catechol.

It will be obvious to those skilled in the art that other methods of preparing our liquid autoxidizable esters can be devised. For example, a triol such as e.g. glycerol, trimethylol ethane and trimethylol propane, can be reacted with 2 mol of a maleinised linseed oil (containing 1 mol of combined maleic anhydride) under conditions such that the anhydride rings open but no esterification of carboxyl groups occurs. In this way a polyol ester containing four fatty acids per mol two free carboxyl groups and one hydroxyl group is obtained. This compound can then be reacted to introduce acrylyl or methacrylyl residues into the molecule.

Another similar technique is to esterify a polyol, for example pentaerythritol or dipentaerythritol with an autoxidizable monocarboxylic acids di-ester of dimethylol propionic acid to introduce the required number of autoxidizable fatty acids into the molecule and then to proceed with the attachment via at least some of the remaining hydroxyl groups of carboxyl groups and acrylyl or methacrylyl residues as described hereinabove.

The rate of autoxidation of films of these esters in contact with air can be accelerated by the use of known catalysts for this type of reaction, for example organometallic compounds such as cobalt and lead naphthenate.

Pigment may be dispersed therein to give pigmented paints using known paint technology. In general, the esters wet out pigments very well and the use of auxiliary dispersing agents is not essential.

When the compositions are to be used in paint and the maximum ease of clean-up with aqueous bases is required, we prefer that the liquid autoxidative ester be diluted with a few percent of a water-soluble organic liquid, for example ethylene glycol monobutyl ether and diethylene glycol diethyl ether.

The invention is illustrated by the following examples in which all parts are given by weight.

EXAMPLE 1

Preparation of an ester according to the invention in which each ester molecule contains on average 4.5 fatty acid residues and 1.3 methacrylyl residues per mol, has an acid value of 61 mgm KOH per gm. and a calculated molecular weight of 2600. The ester is tested as a film-forming component of a paint.

The following materials were charged into a reaction vessel fitted with a reflux condenser and Dean and Stark adapter.

|  | parts |
|---|---|
| dimethylol propionic acid | 67.00 |
| linseed oil fatty acid | 243.70 |
| zinc oxide (catalyst) | 0.20 |
| xylene | 25.00 |

The mixture was refluxed at 200°–205°C, a further 10 parts of xylene being added as required to maintain reflux, and maintained at this temperature until an acid value of 92–96 mgm KOH per gm was reached. 15 mol of water had been collected at this point; equivalent to complete esterification of the fatty acids.

The following materials were then added according to the following procedure:

|  | parts |
|---|---|
| pentaerythritol | 25.50 |
| maleinised linseed oil fatty acid (prepared from equimolar quantities of linseed oil fatty acid and maleic anhydride) | 141.00 |
| diethyl ether of diethylene glycol | 126.00 |
| glycidyl methacrylate | 30.50 |
| dimethylethanolamine | 0.50 |

The temperature of the mixture was raised to 205°–208°C and the pentaerythritol added. Reaction was continued until the acid value fell below 2 mgm KOH per gm; a further 10 gm water was collected. The temperature was then lowered to 125°C and maleinised linseed oil fatty acid and the diethyl ether of diethylene glycol added with vigorous stirring. The course of the reaction was followed by examination of the infra-red spectra of samples of the mixture taken at intervals and reaction was continued until the anhydride peaks at 1850 and 1786 $cm^{-1}$ on the infra-red spectra disappeared. The mixture was cooled to below 100°C, the glycidyl methacrylate and dimethylethanolamine were added and the mixture heated for 2½ hours at 115°–117°C.

The final product was a liquid ester solution with a non-volatile content of 72.7%, an acid value of 61 mgm KOH per gm and a viscosity as measured by a cone and plate viscometer of 1.3 poise.

A 125 micron thick film of the ester (containing 2.5% by wt of a solution of cobalt naphthenate of 3% Co content by wt in mineral spirits) was drawn down on a glass plate and allowed to dry in air at 25°C and 50% relative humidity. It was tack-free in 3½–4 hours.

A paint composition was prepared by sand-grinding together the following ingredients:

|  | parts |
|---|---|
| ester solution prepared as above | 239.00 |
| titanium dioxide | 139.00 |
| diethyl ether of diethylene glycol | 15.00 |
| 3% cobalt naphthenate soln. | 6.00 |

The paint so-prepared had a non-volatile content of about 83% by weight and could be applied by brush to a substrate without difficulty.

A 125 micron film of the paint composition on a glass plate dried in air to a tack-free surface in 3 hours. It was found that a paint brush dipped in the paint composition could be easily washed clean with water.

The equimolar replacement of glycidyl methacrylate by glycidyl acrylate had no significant effect on the properties of either the ester or the paint, as tested.

EXAMPLE 2

Preparation of an ester according to the invention in which each ester molecule contains on average 4.5 fatty acid residues and 1.3 methacrylyl residues per mol, has an acid value of 61 mgm KOH per gm and a calculated molecular weight of approx. 2500.

This ester was prepared by the general method of Example 1 except for the substitution of an equivalent quantity of trimethylol propane for pentaerythritol. The resultant ester had a non-volatile content of 72.1% by wt., an acid value of 61 mgm KOH per gm. and a cone and plate viscosity of 0.9 poise and a 125 micron film on glass dried to a tack-free surface in less than 5 hours.

EXAMPLE 3

Preparation of an ester according to the invention in which each ester molecule contains on average 4.1 fatty acid residues and 1.0 methacrylyl residues per mol, has an acid value of 70 mgm KOH per gm and a calculated molecular weight of approx. 2260.

The following materials were charged into a reaction vessel equipped with a Dean and Stark adapter, a reflux condenser and a nitrogen supply.

|  | parts |
| --- | --- |
| dipentaerythritol | 63.50 |
| linseed oil fatty acid | 278.00 |
| zinc oxide | 0.20 |
| xylene | 25.00 |

The mixture was heated to and maintained at 205°C until the acid value fell below 1 mgm KOH per gm. The reaction was carried out with a slow flow of nitrogen and 10 parts more xylene were added as required to maintain a steady reflux. 18 parts water was removed.

The following materials were added to the resulting product according to the following procedure.

|  | parts |
| --- | --- |
| maleinised linseed oil fatty acid (as in Example 1) | 133.00 |
| phthalic anhydride | 10.70 |
| diethyl ether of diethylene glycol | 100.00 |
| glycidyl methacrylate | 30.00 |
| dimethylethanolamine | 0.50 |

The maleinised linseed oil fatty acid and phthalic anhydride were added with vigorous stirring. The reaction was conducted at 140°–145°C until the infra-red spectra of samples taken from the mixture showed no anhydride peaks at 1786 and 1850 cm$^{-1}$. The remainder of the materials was added and reaction continued at 115°–117°C until an acid value of below 70 mgm KOH per gm was obtained (approx. 2½ hours).

The product had a non-volatile content of 76% by wt., an acid value of 70 mgm KOH per gm and a cone and plate viscosity of 2.9 poise.

A 125 micron film on glass dried to a tack-free surface in 3½ hours and brushes could be washed in a dilute solution of ammonia in water.

EXAMPLE 4

Preparation of a novel ester according to the invention in which each ester molecule contains on average 3.5 fatty acid residues and 0.8 methacrylyl residues per mol, has an acid value of 71.7 mgm KOH per gm and a calculated molecular weight of approx. 1650.

The following materials were charged into a reaction vessel equipped with a Dean and Stark adapter and a reflux condenser.

|  | parts |
| --- | --- |
| dimethylolpropionic acid | 74.00 |
| linseed oil fatty acid | 243.70 |
| zinc oxide | 0.20 |
| xylene | 25.00 |

The mixture was heated at 200°–207°C, further 10 parts of xylene being required and the reaction was continued until the acid value fell to 80 mgm KOH per gm (approx. 2½ hrs). 17.50 parts of water was collected.

The following materials were added to the reaction mixture according to the following method

|  | parts |
| --- | --- |
| trimethylolpropane | 33.50 |
| trimellitic anhydride | 57.60 |
| diethyl ether of diethylene glycol | 60.00 |
| glycidyl methacrylate | 28.40 |
| dimethylethanolamine | 0.40 |

The trimethylolpropane was added and reacted at 205°–208°C until an acid value of 9.6 mgm KOH per gm was reached (this took approximately 10 hours). During this time, a further 7.5 parts of water was distilled off. The trimellitic anhydride was then added and reacted at 165°–175°C for 4 hours followed by the three remaining materials which were reacted at 115°–117°C for 2½ hours. Finally, a further 50.00 parts of the diethyl ether of ethylene glycol was added.

The resulting product had a non-volatile content of 71.5% by wt., an acid value of 71.7 mgm KOH per gm and a cone and plate viscosity of 2.7 poise. A 125 micron film dried to a tack-free surface in 4½ hours when doped, as described in Example 1, with cobalt naphthenate solution.

The ester preparation was repeated but substituting in turn equimolar parts of safflower, soya and tall oil fatty acids for the linseed fatty acids of that example.

Except for slight variations in colour, acid value and drying rate, the esters had analogous characteristics to that of the linseed fatty acids ester.

EXAMPLE 5

Comparisons of some liquid, non-polymeric autoxidizable monocarboxylic fatty acid esters of polyhydric alcohols.

The esters tested had the following compositions:

Ester 1

A triglyceride oil - linseed oil.

Ester 2

Maleinised linseed oil containing on average 0.5 mol of combined maleic anhydride per mol of oil.

Ester 3

Maleinised linseed oil containing on average 1 mol of combined maleic anhydride per mol of oil. In addition, the anhydride ring was opened with water then reacting with glycidyl methacrylate to provide a carboxyl group and a methacrylyl residue.

Ester 4

Hexa-linseed oil fatty acids ester of dipentaerythritol.

Ester 5

As for ester 4 but in addition adducted with maleic anhydride to provide on average 1.5 mol combined maleic anhydride per mol of oil.

Ester 6

As for ester 4 but in addition adducted with maleic anhydride to provide on average 2.0 mol combined maleic anhydride per mol of oil. Further, on average one anhydride ring per mol was ring opened with water then reacted with glycidyl methacrylate to provide a carboxyl group and a methacrylyl residue.

The liquid esters were doped with cobalt naphthenate solution and tested as described in example 1, the results being as shown in the following table.

| Ester No. | M.W. approx. | Acid Value | 1. mol f.a. | 2. mol meth. | drying time -hrs. | 3. brush washing |
|---|---|---|---|---|---|---|
| 1 | 900 | — | 3 | — | over 48 | poor |
| 2 | 950 | 60 | 2.5 | — | " | good |
| 3 | 1000 | 60 | 2.0 | 1.0 | 24 | good |
| 4 | 2000 | 1.5 | 6.0 | — | " | poor |
| 5 | 2100 | 70 | 4.5 | — | over 48 | good |
| 6 | 2200 | 70 | 4.0 | 1.0 | 5 | good |

1. mol of autoxidizable fatty acids per mol of ester.
2. mol of methacrylyl residues per mol of ester.
3. assessment of the ease of clean-up from a brush using water and ammonia as cleaning fluid.

It will be noted that only the ester No. 6 conformed in all respects with the ester according to the invention and it was the only composition which displayed both of the characteristics of fast drying time and good brush clean-up.

We claim:

1. A liquid, non-polymeric, autoxidizable monocarboxylic fatty acid ester of a polyhydric alcohol, characterised in that the ester comprises on average 3.5–4.5 autoxidizable fatty acid residues and 0.8–1.4 acrylyl or methacrylyl residues per molecule, has an acid value of 45–75 mgm KOH per gm provided by carboxyl groups attached thereto and a molecular weight of 1500–3000.

2. A liquid paint composition in which the film-forming component is a liquid, non-polymeric, autoxidizable fatty acid ester of a polyhydric alcohol, according to claim 1.

3. A process of preparing a liquid, non-polymeric, autoxidizable monocarboxylic fatty acid ester of a polyhydric alcohol according to claim 1 wherein a polyhydric alcohol is esterified with autoxidizable monocarboxylic fatty acid at a temperature not exceeding 240°C, at least some of the hydroxyl groups of the polyhydric alcohol are reacted with an acid anhydride at 120°–160°C and portion of the free carboxyl groups so-formed reacted with glycidyl acrylate or methacrylate.

* * * * *